United States Patent [19]

Kannankeril

[11] Patent Number: 4,785,044

[45] Date of Patent: Nov. 15, 1988

[54] FLAME RETARDANT POLYOLEFIN COMPOSITIONS

[75] Inventor: Charles P. Kannankeril, North Caldwell, N.J.

[73] Assignee: Sealed Air Corporation, Saddle Brook, N.J.

[21] Appl. No.: 84,684

[22] Filed: Aug. 12, 1987

[51] Int. Cl.$^4$ ................................................ C08K 5/10
[52] U.S. Cl. .................................... 524/310; 524/312; 524/317; 524/371; 524/466; 524/411
[58] Field of Search ............... 524/310, 317, 312, 371, 524/466, 411

[56] References Cited

U.S. PATENT DOCUMENTS

| | | | |
|---|---|---|---|
| 3,359,220 | 12/1967 | Wright | 260/2.5 |
| 3,527,722 | 9/1970 | Carlson et al. | 260/22 |
| 3,644,230 | 2/1972 | Cronin | 260/23 |
| 3,652,473 | 3/1972 | Quinn et al. | 260/23 |
| 3,730,929 | 5/1973 | Breza | 524/411 |
| 4,022,945 | 5/1977 | MacKenzie, Jr. et al. | 428/389 |
| 4,209,566 | 6/1980 | Betts et al. | 428/384 |
| 4,363,891 | 12/1982 | Rosen | 524/317 |
| 4,373,047 | 2/1983 | Cohen et al. | 524/412 |
| 4,430,470 | 2/1984 | Taniguchi et al. | 524/269 |
| 4,451,604 | 5/1984 | Mills | 524/312 |
| 4,481,324 | 11/1984 | Hall et al. | 524/312 |
| 4,548,964 | 10/1985 | Yoshida et al. | 524/455 |

OTHER PUBLICATIONS

Eng Pi Chang: "Crystallization Studies on Fire-Retardant Polypropylene" J. Appld. Polymer. Sci., vol. 21, 937-942 (1977).

Primary Examiner—Veronica P. Hoke
Attorney, Agent, or Firm—Bell, Seltzer, Park & Gibson

[57] ABSTRACT

Flame retardant polyolefin compositions characterized by a stabilized high halogen content which will not migrate to the surface of articles formed therefrom are disclosed. The compositions comprise a polyolefin resin, a halogen flame retardant compound which is high in halogen content and would ordinarily migrate to the surface of articles formed from the composition, and a polyol having at least one fatty acid substituted thereon. The polyol stabilizes the halogen flame retardant compound and prevents migration thereof to the surface of articles formed from the flame retardant composition. A preferred example of the present invention is a flame retardant polyolefin composition comprising a polyethylene resin, decabromodiphenyl oxide, and a glyceride.

26 Claims, No Drawings

FLAME RETARDANT POLYOLEFIN COMPOSITIONS

FIELD OF THE INVENTION

This inventon relates to flame retardant polyolefin resin compositions. More particularly, it relates to polyolefin resin compositions which include a flame retardant compound high in halogen content, in which the fire retardant compound is stabilized so that it will not migrate to the surface of articles molded from the resin.

BACKGROUND OF THE INVENTION

The term "halogen compounds" refers to compounds containing chlorine, bromine, and the like. Numerous halogen compounds are useful flame retardant compounds for inclusion in polyolefin resin compositions. In general, the higher the halogen content in the compound, the better the flame retardant properties of the compound. For example, decabromodiphenyl oxide (DDO), also called decabromobiphenyl ether, which contains ten bromine atoms, has excellent flame retardant properties.

A problem with DDO and other high halogen content flame retardants is that they are not stable in the polyolefin resins into which they are incorporated. When articles are molded from resins containing such compounds, the fire retardant compounds migrate ("bloom") to the surface of the article and form a powder layer which can then rub off. The formation of such a powder layer is not only merely unsightly: it reflects an escape of the flame retardant compound from the molded article and a cosequential reduction in the flame retardancy characteristics. As a result, the art has taught away from using such high halogen containing compounds in polyolefin resins. For example, U.S. Pat. No. 4,548,964 to Yoshida and Mori, titled "Flame-Retardant Polyester Resin Composition," teaches as follows:

> The other flame retarder which is used in combination with the flame retarder (C) must be HBBE (D) [or "hexabromobiphenyl ether"]. It is not desirable to use decabromobiphenyl ether which is analogous to HBBE but is different in bromine content. This is because, when a molded article containing decabromobiphenyl ether is exposed to elevated temperatures, the decabromobiphenyl ether blooms to the surface of the molded article and looks like a white powder. In contrast, HBBE barely escapes even at elevated temperatures and causes no change in the surface of the molded articles.

Accordingly, an object of the present invention is to provide polyolefin resins which include DDO or other high halogen content flame retardant compounds, in which the flame retardant compound is stabilized so it will not migrate to the surface of articles formed from the resin composition.

DESCRIPTION OF THE INVENTION

The foregoing and other objects and advantages of the present invention are accomplished by a flame retardant polyolefin composition comprising a polyolefin resin, a halogen flame retardant compound which is high in halogen content (which would ordinarily migrate to the surface of articles formed from the composition), and a polyol having at least one fatty acid substituted thereon (a substituted polyol). The polyol stabilizes the halogen flame retardant compound and prevents migration thereof to the surface of articles formed from the flame retardant composition. Preferably, said polyol is included in said composition in an amount, by weight, of from about 0.25 percent to about 2.0 percent.

More particularly, the present invention is a flame retardant composition comprising a polyolefin resin, a halogen flame retardant compound which is high in halogen content (which would ordinarily migrate to the surface of articles formed from the composition), and an ester of a fatty acid and a polyol having two to six hydroxyl groups. The ester stabilizes the halogen flame retardant compound and prevents migration thereof to the surface of articles formed from the flame retardant composition. Preferably, said ester is included in said composition in an amount, by weight, of from about 0.25 percent to about 2.0 percent.

The invention, in another aspect, comprises articles formed from the foregoing compositions. Such articles can be formed by molding procedures, as is known in the art.

Examples of polyolefin resins useful for practicing the present invention include polyethylene, polypropylene, copolymers of ethylene with up to 10 percent of 1-butene, 1-hexene and 1, 3-butadiene, poly-1 butene, poly-4-methyl-1-pentene, and mixtures thereof. The polyolefins used in this invention are preferably polymers of one or more alpha-olefins having 2 to 8 carbons atoms per molecule. The presently preferred polyolefin for the composition of this invention is polyethylene, with low density polyethylene particularly preferred.

Halogen flame retrdant compounds high in halogen content used in practicing the present invention are preferably flame retardant compounds containing about ten or more halogen atoms per molecule. Specific examples of compounds particularly preferred for practicing the present invention include decabromodiphenyl oxide (DDO) and perchloropentacyclooctane (PPC). PPC, which contains 12 chlorine atoms, presents migration problems similar to DDO when polyolefin resin compositions containing this compound are used to form molded articles. For the purpose of practicing the present invention, DDO is particularly preferred. Those skilled in the art will, however, appreciate that other flame retardant compounds which are high in halogen content, and would present similar migration problems which have heretofore prevented their use in polyolefin resin compositions, may also be used in practicing the present invention.

Polyols used to practice the present invention are preferably polyols having two to six hydroxyl groups. Examples of such polyols include ethylene glycol (1,2-ethanediol), propylene glycol (1,2-propanediol), trimethylene glycol (1,3-propanediol), glycerol, 1,2-cyclopentanediol, and pentaerythritol. A preferred polyol for practicing the present invention is glycerol.

Fatty acids are substituted on the polyol by forming an ester of the polyol and the fatty acid. Preferably, the substituted polyol, or ester, has at least one unsubstituted hydroxyl group. Preferred fatty acids for carrying out the present invention are more particularly described as aliphatic monocarboxylic acids having an alkyl chain of 10 to 30 carbon atoms. Examples of such aliphatic monocarboxylic acids include lauric acid, myristic acid, palmitic acid, stearic acid, arachic acid, cerotic acid, melissic acid and n-hentriacontanoic acid. These compounds may be used either alone or in admixture. A particularly preferred fatty acid for carrying out the present invention is stearic acid.

Those skilled in the art will appreciate from the foregoing discussion that a preferred class of substituted polyols for carrying out the present invention is the glycerides, including monoglycerides, diglycerides, triglycerides, and mixtures thereof. Such glycerides are obtained from the glycerolysis of natural fats or oils such as beef tallow, butter fat, coconut oil, corn oil, olive oil, soy bean oil, and mixtures thereof. Other examples of glycerides useful for the purposes of this invention are synthetic glycerides such as glycerol monostearate, (commonly available as Atmos 84 from ICI of America Inc., Atmos 84 has a HLB of 3.8), glycerol monolaurate, glycerol monococoate, glycerol dioleate, glycerol monomyristate, glycerol monopalmitate, glycerol dipalmitate, and glycerol distearate. Monoglycerides and, to a lesser extent, diglycerides, are preferred. As these compounds are ordinarily provided in mixtures, mixtures high in monoglyceride content should be understood to be preferred.

A metal oxide flame retardant compound may optionally be included in the composition because of the enhancement in flame retardancy resulting from the combination of a metal oxide flame retardant compound with a halogen flame retardant compound, as is known in the art. Preferred metal oxide compounds for this purpose are antimony oxide compounds, such as antimony trioxide and antimony oxychloride. Antimony trioxide is particularly preferred.

Depending upon the particular end use for which the polyolefin resin composition of the present invention are intended, inorganic fillers may be incorporated into the composition. No particular limitation is placed on the type of inorganic filler, but specific examples thereof include talc, kaolin, wollastonite, silica, mica, calcium carbonate, diatomaceous earth, ground quartz, clay and white carbon. Among these inorganic fillers, talc and white carbon are particularly preferred because the former is effective in improving moldability and the latter is effective in improving antidripping properties. These inorganic fillers may be used either alone or in admixture of two or more. If desired, the polyolefin composition of the present invention can further contain such additives as light or heat stabilizers, dyes, pigments and nucleating agents.

The present invention is further illustrated by the following non-limiting examples. In these examples, all parts and percentages are expressed by weight unless otherwise indicated.

EXAMPLE 1

A series of ten fire retardant polyolefin resin compositions were formed from low density polyethylene, 8% DDO, 4% antimony trioxide, and between 0 and 1% glyceride. The glyceride was glycerol monostearate in a purity of from 40% to 98%, depending upon the amount of diglyceride and triglyceride present. The control compositions contained no glyceride. These compositions were formed into molded articles by extrusion at a temperature of 500 degrees Fahrenheit, the articles aged at 75 degrees Fahrenheit, and the aged articles periodically inspected for migration of DDO. The results of these tests are reported in Table 1.

TABLE 1

| Flame Retardant Formula | Burning Time (Sec). 10 Samples | Aging Test for Migration at 75° F. | |
|---|---|---|---|
| | | Migration Present | No Migration |
| Control | 1-3 | 3 weeks | — |
| 1% Glyceride (98% Active Monoglyceride) | 1-3 | — | 9 Months + |
| 0.5% Glyceride (98% Active Monoglyceride) | 1-3 | — | 9 Months + |
| 0.25% Glyceride (98% Active Monoglyceride) | 1-3 | — | 9 Months + |
| 1% Glyceride (90% Active Monoglyceride) | 1-3 | — | 9 Months + |
| 0.5% Glyceride (90% Active Monoglyceride) | 1-3 | — | 9 Months + |
| 0.25% Glyceride (90% Active Monoglyceride) | 1-3 | — | 9 Months + |
| 1% Glyceride (40% Active Monoglyceride) | 1-3 | — | 9 Months + |
| 0.5% Glyceride (40% Active Monoglyceride) | 1-3 | — | 9 Months + |
| 0.25% Glyceride (40% Active Monoglyceride) | 1-3 | — | 9 Months + |

These data show that inclusion of even a small quantity of glyceride markedly decreased migration of DDO over time.

EXAMPLE 2

A second set of ten samples were prepared in the manner described above and aged at 110 degrees Fahrenheit. The results of these tests are reported in Table 2.

TABLE 2

| Flame Retardant Formula | Burning Time (Sec). 10 Samples | Aging Test for Migration at 110° F. | |
|---|---|---|---|
| | | Migration Present | No Migration |
| Control | 1-3 | 12 hours | — |
| 1% Glyceride (98% Active Monoglyceride) | 1-3 | — | 30 Days + |
| 0.5% Glyceride (98% Active Monoglyceride) | 1-3 | — | 30 Days + |
| 0.25% Glyceride (98% Active Monoglyceride) | 1-3 | — | 30 Days + |
| 1% Glyceride (90% Active Monoglyceride) | 1-3 | — | 30 Days + |
| 0.5% Glyceride (90% Active Monoglyceride) | 1-3 | — | 30 Days + |
| 0.25% Glyceride 90% Active Monoglyceride) | 1-3 | — | 30 Days + |
| 1% Glyceride (40% Active Monoglyceride) | 1-3 | — | 30 Days + |
| 0.5% Glyceride (40% Active Monoglyceride) | 1-3 | — | 30 Days + |
| 0.25% Glyceride (40% Active Monoglyceride) | 1-3 | — | 30 Days + |

These tests again showed that inclusion of glyceride markedly decreased migration of DDO.

EXAMPLE 3

A third set of ten sample articles were prepared in the manner described above and aged at 130 degrees Fahrenheit. The results of these tests are reported in Table 3.

TABLE 3

| Flame Retardant Formula | Burning Time (Sec). 10 Samples | Aging Test for Migration at 130° F. | |
|---|---|---|---|
| | | Migration Present | No Migration |
| Control | 1-3 | 6 hours | — |
| 1% Glyceride (98% Active Monoglyceride) | 1-3 | — | 30 Days + |
| 0.5% Glyceride (98% Active Monoglyceride) | 1-3 | — | 30 Days + |
| 0.25% Glyceride (98% Active Monoglyceride) | 1-3 | — | 30 Days + |
| 1% Glyceride (90% Active Monoglyceride) | 1-3 | — | 30 Days + |
| 0.5% Glyceride (90% Active Monoglyceride) | 1-3 | — | 30 Days + |
| 0.25% Glyceride (90% Active Monoglyceride) | 1-3 | — | 30 Days + |
| 1% Glyceride (40% Active Monoglyceride) | 1-3 | 30 Days Slight | — |
| 0.5% Glyceride (40% Active Monoglyceride) | 1-3 | 30 Days Moderate | — |
| 0.25% Glyceride (40% Active Monoglyceride) | 1-3 | 30 Days Moderate | — |

Even at this elevated temperature, the inclusion of glyceride decreased migration of DDO. Still better results can be obtained if the initial extrusion temperature used when the articles are formed is lowered. These articles were formed at a relatively high extrusion temperature of 500 degrees Fahrenheit. Table 3 also reveals that glycerides containing a higher percentage of monoglyceride were more effective in controlling migration of DDO.

EXAMPLE 4

A fourth set of ten sample articles were prepared in the manner described above and aged at 140 degrees Fahrenheit. The results of these tests are set forth in Table 4.

TABLE 4

| Flame Retardant Formula | Burning Time (Sec). 10 Samples | Aging Test for Migration at 140° F. | |
|---|---|---|---|
| | | Migration Present | No Migration |
| Control | 1-3 | 2 hours | — |
| 1% Glyceride (98% Active Monoglyceride) | 1-3 | — | 30 Days + |
| 0.5% Glyceride (98% Active Monoglyceride) | 1-3 | — | 30 Days + |
| 0.25% Glyceride (98% Active Monoglyceride) | 1-3 | — | 30 Days + |
| 1% Glyceride (90% Active Monoglyceride) | 1-3 | — | 30 Days + |
| 0.5% Glyceride (90% Active Monoglyceride) | 1-3 | — | 30 Days + turned cloud |
| 0.25% Glyceride (90% Active Monoglyceride) | 1-3 | — | 30 Days + turned cloud |
| 1% Glyceride (40% Active Monoglyceride) | 1-3 | 30 Days Slight | — |
| 0.5% Glyceride (40% Active Monoglyceride) | 1-3 | 30 Days Moderate | — |
| 0.25% Glyceride (40% Active Monoglyceride) | 1-3 | 30 Days Moderate | — |

While Table 4 reveals a strong correlation between the degree of migration of DDO and the proportion of monoglyceride to di- and triglyceride, as suggested by the data set forth in Table 3, the total quantity of glyceride appeared less pertinent to DDO migration, with even small quantities of glyceride serving to effectively reduce the migration of DDO.

A fifth set of four articles were prepared in the manner described above, except that perchloropentacyclooctane was substituted for decabromodiphenyl oxide as the halogen flame retardant compound. The articles were aged at a temperature of 140 degrees Fahrenheit. The results of these tests are set forth in Table 5.

TABLE 5

| Flame Retardant Formula | Aging Test for Migration at 140° F. | |
|---|---|---|
| | Migration Present | No Migration |
| Control | 24 hours | — |
| 1% Glyceride (98% Active Monoglyceride) | — | 20 Days + |
| 0.5% Glyceride (98% Active Monoglyceride) | — | 20 Days + |
| 0.25% Glyceride (98% Active Monoglyceride) | — | 20 Days + |

Table 5 indicates that the present invention can be used to reduce the migration of halogen flame retardant compounds other than DDO.

The invention has been discussed with a degree of specificity above. This discussion has been provided for illustrative purposes only, with the scope of the invention being defined by the following claims.

That which is claimed is:

1. A flame retardant polyolefin composition comprising a polyolefin resin, a halogen flame retardant compound high in halogen content which would ordinarily migrate to the surface of articles formed from said composition, and an esterified hydrocarbyl polyol having at least one fatty acid esterified thereon to stabilize said halogen flame retardant compound and prevent migration thereof to the surface of articles formed from said flame retardant composition.

2. A flame retardant composition as claimed in claim 1, wherein said halogen flame retardant compound comprises a compound containing about ten or more halogen atoms per molecule.

3. A flame retardant composition as claimed in claim 1, wherein said halogen flame retardant compound is selected from the class consisting of decabromodiphenyl oxide and perchloropentacyclooctane.

4. A flame retardant composition as claimed in claim 1, wherein said esterified hydrocarbyl polyol has at least one unesterified hydroxyl group.

5. A flame retardant composition as claimed in claim 1, wherein said fatty acid is an aliphatic monocarboxylic acid having an alkyl chain of 10 to 30 carbon atoms.

6. A flame retardant composition as claimed in claim 1, wherein said esterified hydrocarbyl polyol is glycerol.

7. A flame retardant composition as claimed in claim 1, wherein said esterified hydrocarbyl polyol is included in said composition in an amount, by weight, of from about 0.25 percent to about 2.0 percent.

8. A flame retardant composition as claimed in claim 1, wherein said halogen flame retardant compound is decabromophenyl oxide.

9. A flame retardant composition as claimed in claim 1, further comprising a metal oxide flame retardant compound.

10. A flame retardant composotion as claimed in claim 9, wherein said metal oxide flame retardant compound comprises antimony trioxide.

11. A flame retardant polyolefin composition comprising a polyolefin resin, a halogen flame retardant compound selected from the class consisting of decabromodiphenyl oxide and perchloropentacyclooctane, and an ester of a fatty acid and a hydrocarbyl polyol having two to six hydroxyl groups to stabilize said halogen flame retardant compound and prevent migration thereof to the surface of articles formed from said flame retardant composition.

12. A flame retardant composition as claimed in claim 1, wherein said polyolefin resin is a polyethylene resin.

13. A flame retardant composition as claimed in claim 11, wherein said ester has at least one unsubstituted hydroxyl group.

14. A flame retardant composition as claimed in claim 11, wherein said fatty acid is an aliphatic monocarboxylic acid having an alkyl chain of 10 to 30 carbon atoms.

15. A flame retardant composition as claimed in claim 11, wherein said ester is a monoglyceride.

16. A flame retardant composition as claimed in claim 11, wherein said ester is included in said composition in an amount, by weight, of from about 0.25% to about 2.0%.

17. A flame retardant composition as claimed in claim 11 wherein said halogen flame retardant composition is decabromodiphenyl oxide.

18. A flame retardant composition as claimed in claim 11, further comprising a metal oxide flame retardant compound.

19. A flame retardant composition as claimed in claim 18, wherein said metal oxide flame retardant compound is antimony trioxide.

20. A flame retardant polyolefin composition, comprising a polyethylene resin, decabromodiphenyl oxide, and a glyceride.

21. A flame retardant composition as claimed in claim 20, wherein said glyceride is a monoglyceride.

22. A flame retardant composition as claimed in claim 21, wherein said monoglyceride comprises glycerol monostearate.

23. A flame retardant composition as claimed in claim 22, wherein said glycerol monostearate is included in said composition in an amount, by weight, of from about 0.25% to about 2.0%.

24. A flame retardant composition as claimed in claim 23, further comprising antimony trioxide.

25. A flame retardant composition as claimed in claim 24, wherein said polyethylene resin comprises a low density polyethylene resin.

26. An article formed from the composition defined in claim 1, 11 or 20.

* * * * *